United States Patent [19]

Guntly et al.

[11] Patent Number: 4,864,705
[45] Date of Patent: Sep. 12, 1989

[54] METHOD OF MAKING A CARBURETOR

[75] Inventors: Thomas G. Guntly, Hartford; Mark E. Federspiel; Michael J. Kurth, both of West Bend, all of Wis.

[73] Assignee: Tecumseh Products Company, Tecumseh, Mich.

[21] Appl. No.: 267,037

[22] Filed: Nov. 4, 1988

[51] Int. Cl.⁴ .............................................. B23P 15/00
[52] U.S. Cl. ............................... 29/156.4 R; 29/412; 29/428; 29/DIG. 47
[58] Field of Search ............. 29/156.4 R, 157 C, 525, 29/526 R, 428, DIG. 47, 412, 557, 558; 261/35, 34, 70, 72.1, 119.2, DIG. 45, DIG. 52; 72/254

[56] References Cited

U.S. PATENT DOCUMENTS

| 847,635 | 3/1907 | Astfalck | 72/254 |
|---|---|---|---|
| 1,615,398 | 1/1927 | Mock et al. | |
| 1,625,867 | 4/1927 | Plant | |
| 1,931,259 | 10/1933 | Kirby | 261/41 |
| 2,701,709 | 2/1955 | Brunner | 261/41 |
| 3,338,565 | 8/1967 | Heid | 261/70 |
| 3,661,480 | 5/1972 | Forschner et al. | 72/254 |
| 3,731,517 | 5/1973 | Johnson | 29/DIG. 47 |
| 3,959,864 | 6/1976 | Tell | 29/DIG. 47 |
| 4,003,968 | 1/1977 | Rickert | 261/35 |
| 4,113,073 | 9/1978 | Lusa et al. | 29/DIG. 47 |
| 4,224,816 | 9/1980 | Elhaus et al. | 72/254 |
| 4,447,371 | 5/1984 | Busch | 261/53 |
| 4,518,542 | 5/1985 | Rogers | 261/34 |
| 4,578,228 | 3/1986 | Gerhardy | 261/41 |
| 4,691,423 | 9/1987 | Willyard, Jr. et al. | 29/156.4 R |
| 4,782,738 | 11/1988 | Jackson et al. | 72/254 |

Primary Examiner—Howard N. Goldberg
Assistant Examiner—Irene Cuda
Attorney, Agent, or Firm—Albert L. Jeffers; John F. Hoffman

[57] ABSTRACT

A method of making a carburetor by first extruding a length of material and then cutting a carburetor body of predetermined length from the extrusion. The extrusion includes a passageway. A venturi member is molded of plastic material and inserted in the passageway. A fuel bowl is molded from plastic material and is secured to the body by means of a resilient clip.

20 Claims, 3 Drawing Sheets

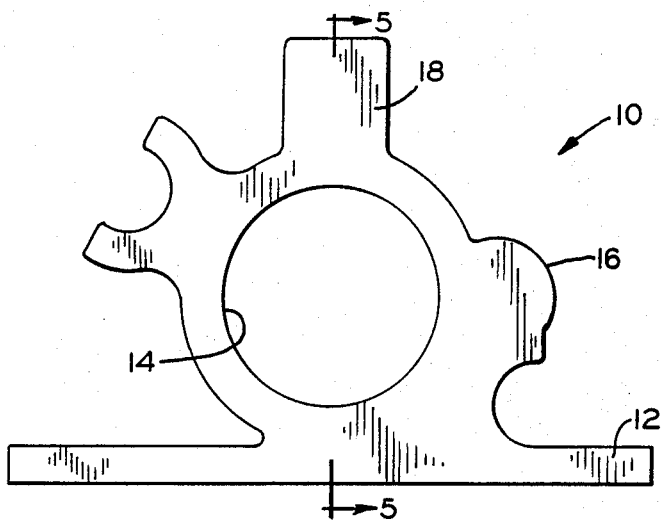
FIG_1
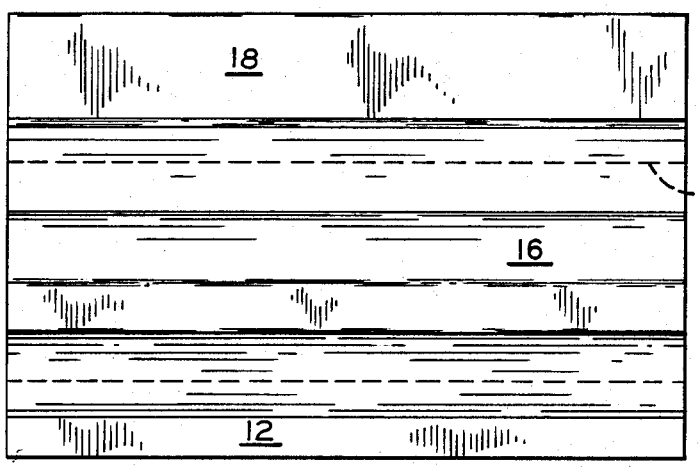
FIG_2
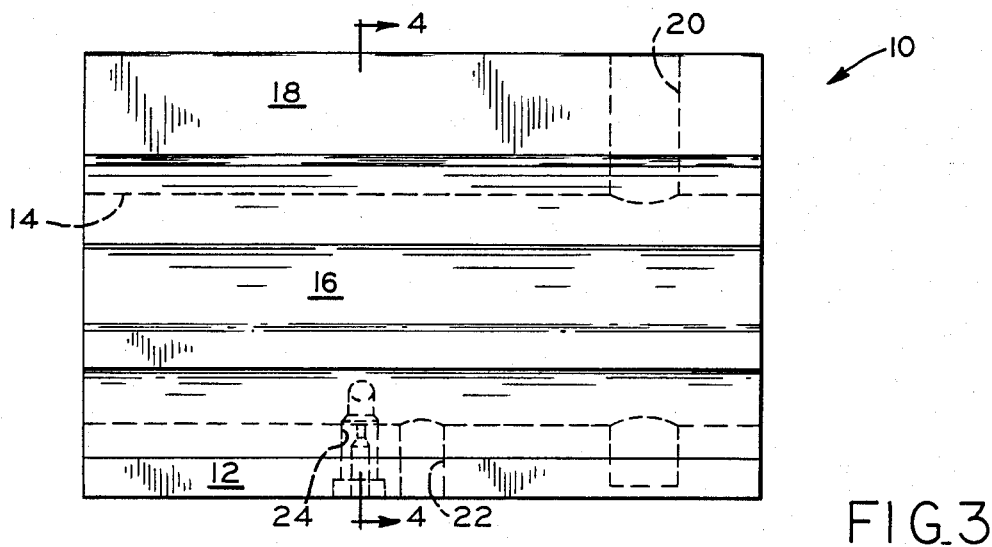
FIG_3

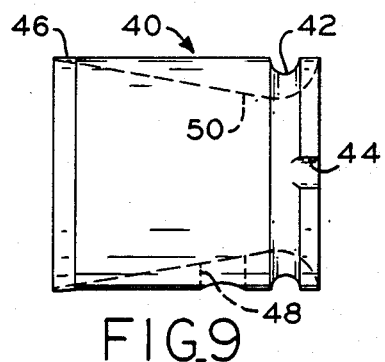
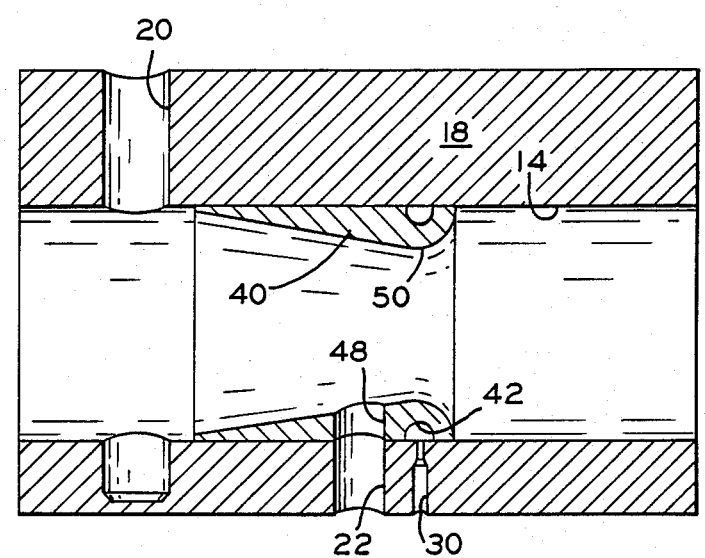
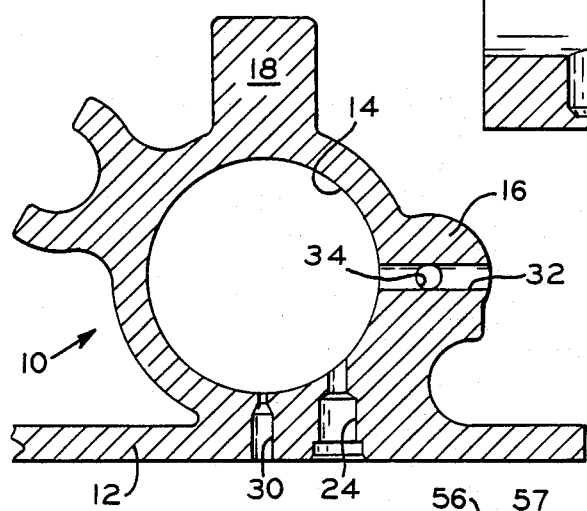
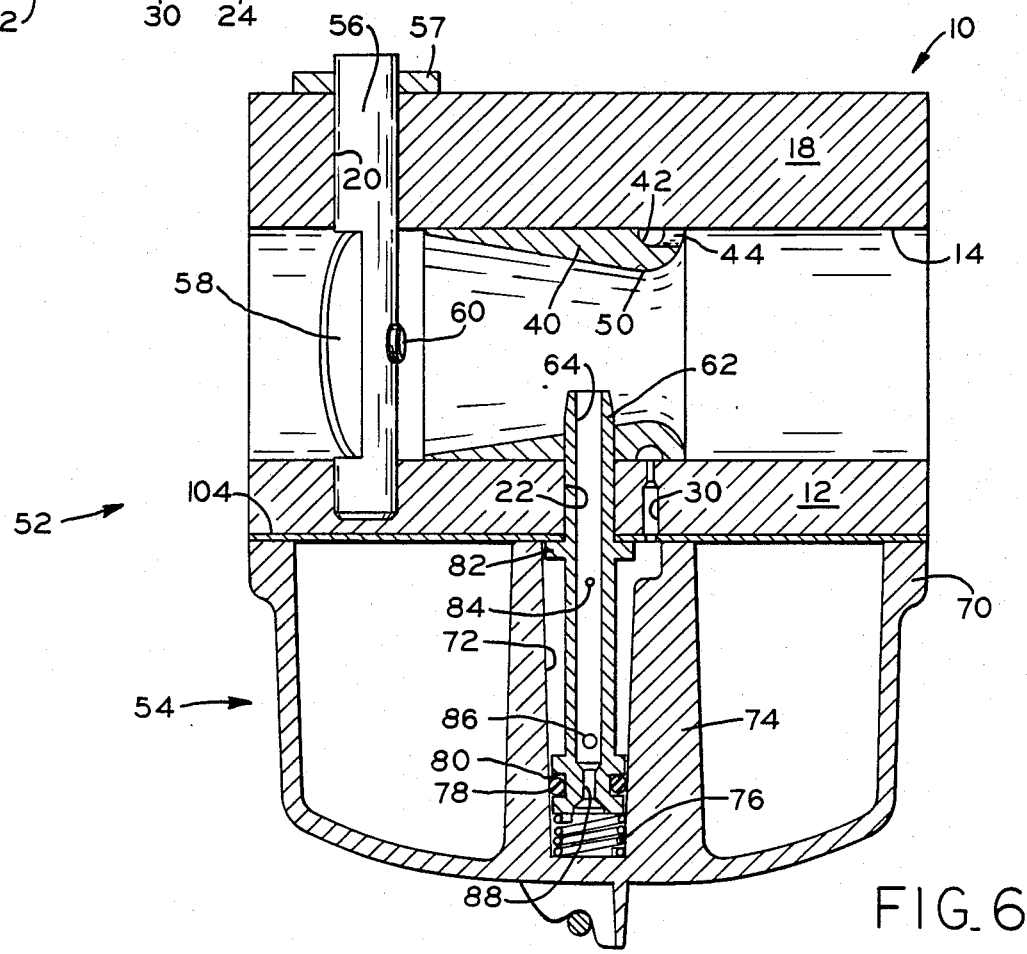

METHOD OF MAKING A CARBURETOR

BACKGROUND OF THE INVENTION

This invention relates to carburetors for small internal combustion engines, and in particular to a method for making carburetors for small internal combustion engines such as are used in lawnmowers, snowblowers, chainsaws and the like.

Prior art carburetors have generally been manufactured by die-casting a body and securing a fuel bowl assembly thereto by means of threaded fasteners. The die-cast body is generally made of either aluminum or zinc. Since die-cast aluminum tends often to be porous, die-cast aluminum carburetor bodies must first be impregnated with a special sealing material. After casting, the body must be machined to provide numerous orifices, apertures and the like. While zinc may be used as a die-casting material and is not as porous as aluminum so that it does not need to be impregnated to seal the body, zinc is higher in weight and cost than aluminum and therefore is not a preferred material. In small internal combustion engines, especially those which are used in hand held or easily maneuvered appliances, such as leafblowers, lightweight snowblowers and the like, it is particularly important that the weight of the carburetor be kept to a minimum.

The fuel bowl of prior art carburetor assemblies was generally either made of cast metal or was molded from plastic. Prior art carburetors have also been provided with molded plastic bodies in an attempt to reduce machining and the overall number of separate components required for a carburetor. By manufacturing the carburetor from plastic, many of the details which would normally be machined may be molded in. However, it is difficult to mold certain of the orifices and other features which must be held to required close tolerances such as, for instance, 0.002 of an inch on a 0.250 dimension or larger. Two items which are particularly difficult to mold in plastic carburetor bodies are the throttle bore and the throttle shaft bore. Both of these bores must be held to very tight tolerances and their alignment to each other in the carburetor body is critical. Good performance of a carburetor requires a true throttle bore, especially in a full progression carburetor. Even if close tolerances can be held during the plastic molding process, in time, after the plastic structure has been subjected to thermal cycling and/or stress under load, the plastic material tends to deform due to plastic creep and the tolerance limits are therefore exceeded. Manufacturers have attempted to avoid this problem by eliminating certain functions from the carburetor such as, for instance, an idle system, thereby both limiting performance capabilities and avoiding the need for precision bores.

In some plastic carburetor structures, the throttle bore, throttle shaft bore and idle progression holes are machined in an aluminum portion of the carburetor in order to insure close tolerances. In another attempt to improve performance of molded plastic carburetors, high quality glass, reinforced plastic, or mineral filled plastic materials have been used. However, such filler materials make drilling and machining of the plastic carburetor very difficult. Furthermore, the cost of high quality plastic can be as much as the cost of aluminum.

Still another problem with prior art plastic carburetors has been that the performance of some plastics will deteriorate by contact with gasoline, gasoline/alcohol blends, and especially decomposing gasoline which generates acids and peroxides. Thus it is desired to provide a carburetor for small internal combustion engines which is not only low in cost and is simple to manufacture but has excellent performance, is simple to assemble, and easy to service.

SUMMARY OF THE INVENTION

The present invention overcomes the disadvantages of the above-described prior art carburetors by providing an improved method of making a carburetor. The method of making the carburetor comprises forming an extrusion, cutting a carburetor body of desired length from the extrusion, inserting a molded venturi in the through passage, molding a fuel bowl from plastic material and securing the fuel bowl to the body by means of a spring clip.

One advantage of the present invention is that it provides a low cost carburetor which has excellent performance and is very simple to assemble whereby the manufacturing process of the carburetor may be automated.

Another advantage of the method according to the present invention is that the tooling cost for manufacturing the carburetor is lower than was necessary with prior art methods of manufacturing carburetors.

A further advantage of the method according to the present invention is that it results in a lightweight aluminum carburetor wherein the extruded body need not be impregnated to seal the body as extruded aluminum is much less porous than die-cast aluminum.

A still further advantage of the method according to the present invention is that it results in a carburetor which is easy to service because the carburetor can be disassembled by merely removing the spring clip without the use of any special tools.

The present invention, in one form thereof, comprises a method for making a carburetor by forming an extrusion, cutting a body of desired length from the extrusion, providing a fuel bowl, and securing the fuel bowl to the body.

The present invention, in another form thereof, comprises a method for making a carburetor by forming an extrusion, cutting a carburetor body of predetermined length from the extrusion, molding a fuel bowl from a plastic material, providing a resilient clip and securing the fuel bowl to the body with the resilient clip.

The present invention, in yet another form thereof, comprises a method for making a carburetor including forming an extrusion, cutting a carburetor body of predetermined length from the extrusion, providing a venturi member, inserting the venturi member into a cavity of the body, molding a fuel bowl from plastic material, and securing the fuel bowl to the body by means of a resilient clip.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawings wherein:

FIG. 1 is a front elevational view of an extruded carburetor body;

FIG. 2 is a side elevational view of the carburetor body of FIG. 1 taken from the right hand side thereof;

FIG. 3 is a side elevational view of the carburetor body of FIG. 1 taken from the right hand side thereof with several of the passages and cavities in the extruded body shown in dotted lines;

FIG. 4 is a cross sectional view of the carburetor body of FIG. 1 taken along line 4—4 of FIG. 3;

FIG. 5 is a cross-sectional view taken along line 5—5 of FIG. 1 and showing the carburetor body with a venturi member inserted therein;

FIG. 6 is a cross-sectional view of a carburetor assembly including the carburetor body of FIG. 1;

FIG. 9 is an elevational view of the venturi member for the carburetor of FIG. 6.

Corresponding reference characters indicate corresponding parts throughout the several views of the drawings.

Figure 7:
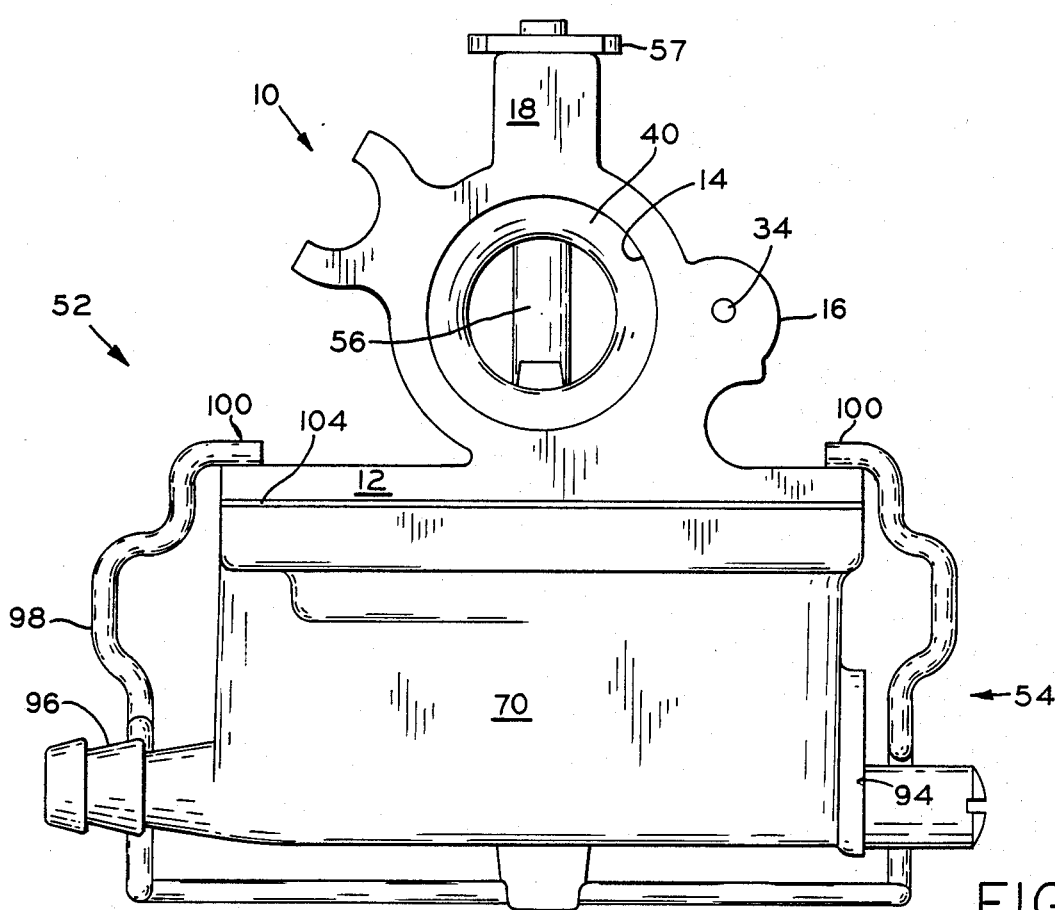
FIG. 7 is a front elevational view of the carburetor assembly of FIG. 6.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Referring to FIGS. 1-4, there is shown a carburetor body 10 which is formed by extruding a length of extrudable material through an extruding die and from which a desired length is then cut. In the preferred embodiment disclosed herein, the material used is aluminum, however other suitable materials may also be used. An advantage of using extruded aluminum for the carburetor body is that extruded aluminum does not need to be impregnated with sealing material to make it non-porous as is the case with die-cast aluminum. As can be seen by referring in particular to FIGS. 2 and 3, all of the extruded portions of the carburetor body run lengthwise along the body from right to left and are of uniform transverse dimensions as shown in FIGS. 1-3. Thus, as shown, the extrusion includes a flat base 12, a through bore 14, a projection 16, and a top portion 18. Additional bores, projections and the like may also be incorporated into the body as desired for a particular carburetor design. Thus, this method of manufacturing carburetor body is advantageous in that the extrusion surface is smooth as compared to die-castings which cannot be made equally smooth, therefore, less machining is necessary for finishing various surfaces of the carburetor body.

It should be pointed out that tooling costs for the carburetor body are also less than for die-casting.

Flat base 12 is used to mount the body 10 to the fuel bowl as further explained hereinafter. Furthermore, the upstanding top portion 18 is provided to ensure that sufficient material is available to provide for a throttle and choke shaft bore which provides bearing area to reduce wear. After extruding the body and cutting it to length, machining operations are performed to provide further bores, apertures, passages and the like in the carburetor body. The machining of holes and passages is limited to four sides rather than six sides, as in the case of a cast carburetor body, to thereby enhance automation. It should also be understood that additional bores may be made in the carburetor body such as, for instance, a throttle shaft bore 20 shown in FIG. 3, a nozzle bore 22, and a fuel bowl vent bore 24. Additionally, as shown in FIG. 4, well vent bore 30, as well as vent passages 32 and 34 are machined into the body.

The next step in the manufacturing process is the insertion of a venturi member in the through bore 14 of the carburetor.

By referring to FIGS. 5 and 9, a venturi member is shown. The venturi may be either molded, cast, or machined. In the preferred embodiment, the venturi member is molded from a plastic material. The venturi member includes an annular channel or groove 42 at one end thereof and an axial groove 44 which interconnects with the annular groove 42. These two grooves, after assembly of the venturi member into the through bore 14, form passages therewith for venting purposes. Thus, for instance, it can be seen in FIG. 5 that annular groove 42 connects with well vent 30. Additionally, by referring to FIG. 4, it should be noted that vent passage 32 connects with the passage formed by annular groove 42 with the wall of through bore 14. Lastly, it should also be noted that the bowl vent 24 connects with the passage formed by groove 42 with through bore 14.

Referring further to FIG. 9, it can be seen that venturi 40 includes a tapered edge portion 46 which, upon insertion of the venturi member 40 into through bore 14, is deflected inwardly by virtue of the fact that tapered edge 46 is flexible. Thus the venturi is securely sealed in through bore 14 whereby no leakage around the venturi is possible.

Venturi 40 also includes a nozzle aperture 48 which is aligned with nozzle bore 22 in body 10 for purposes further explained hereinafter. Lastly, it should be noted that venturi member 40 is shaped to provide a nozzle throat 50 for generating a low pressure zone within the venturi member 40 as is conventional in carburetor throats.

Thus, in summary, the steps necessary to form the carburetor body described so far is to form the extrusion in the extrusion die, cut the extrusion to length, perform the necessary machining operations to form various passages and bores in the body, and insert the venturi member in the through bore of the carburetor body.

Figure 8:
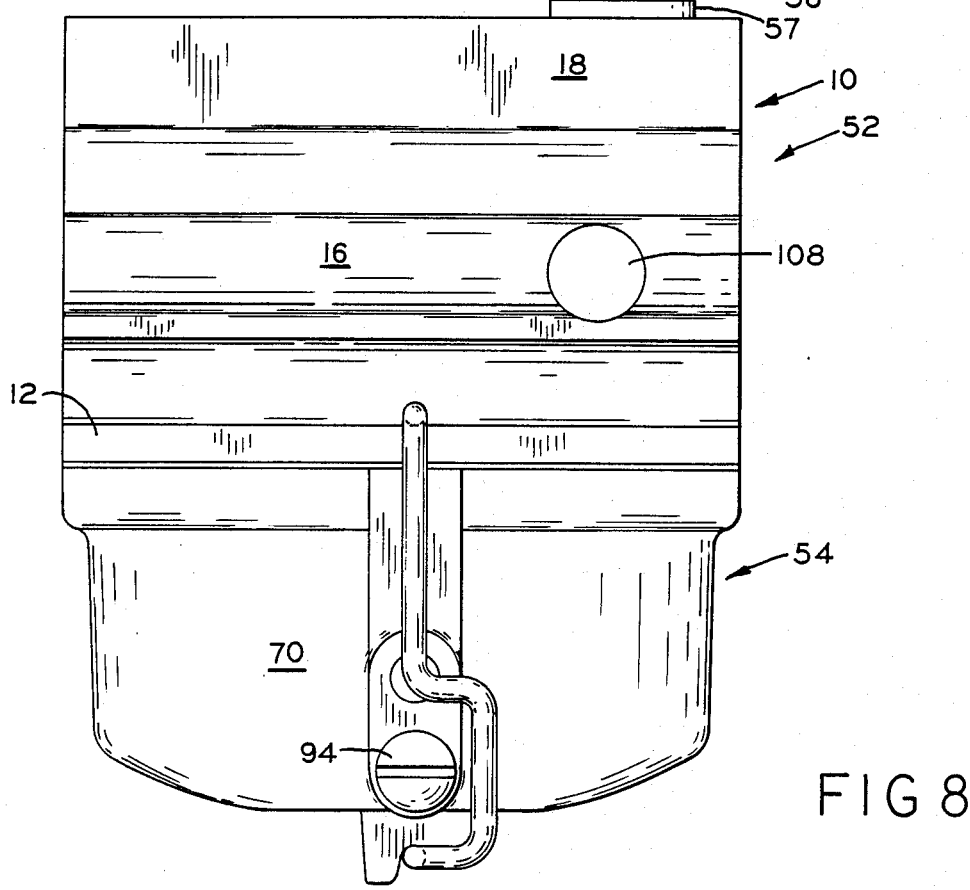
FIG. 8 is a side elevational view of the carburetor assembly from the right hand side of FIG. 7.

The carburetor body is now ready for assembly to the fuel bowl assembly as best seen in FIGS. 6-8. For further description of the carburetor assembly, reference may be had to U. S. patent application Ser. No. 267,019, entitled CARBURETOR ASSEMBLY, filed on even date herewith which is assigned to the assignee of the present invention and which disclosure is incorporated herein by reference. The carburetor assembly 52 includes the carburetor body 10 and the fuel bowl assembly 54. The carburetor body is provided with a throttle shaft 56 which is inserted in throttle shaft bore 20 and which is sealed to upper portion 18 of body 10 by means of a seal washer 57. Throttle shaft 56 has throttle plate 58 secured thereto by a fastener 60 for control of the fuel mixture into the cylinders of the engine. Fuel bowl assembly 54 includes a nozzle 62 which is inserted through nozzle bore 22 in body 10 and nozzle aperture 48 in venturi member 40. Thus it can be seen that nozzle 62 aids in positioning venturi member 40 and retaining it in the through bore 14 of body 10. Nozzle 62 includes a nozzle passage 64 whereby fuel can be drawn into the throat 50 of the venturi from fuel bowl 70. The fuel bowl 70, in the disclosed embodiment is molded from plastic but may also be formed in other ways such as, for instance, from cast metal. By molding fuel bowl 70 from plastic, a number of components may be molded directly into the fuel bowl assembly rather than being added thereto, thereby effecting additional cost savings. The molded fuel bowl assembly 54 includes a well 72 formed by an upstanding wall 74 which is molded generally centrally of the fuel bowl 70. Within well 72 a spring 76 is provided for biasing nozzle 62 upwardly whereby shoulder 82 of nozzle 62 is biased against flat 12 of body 10, thereby providing a good seal therewith. Nozzle 62 is sealed inside well 72 by means of an O-ring 78 which is seated in a groove 80 to prevent fuel from leaking past the bottom portion of nozzle 62 into the upper portion of well 72. It can be seen that the well is vented by means of passage 30 which, as described hereinbefore, is interconnected with the channel formed by annular groove 42 with bore 14 of body 10. Nozzle 62 also includes two additional passages 84 and 86 whereby air may be drawn into nozzle passage 64 through aperture 84 and wherein fuel can flow into well 72 through passage 86. A metering jet aperture 88 is formed in the bottom portion of nozzle 62 whereby fuel is metered from the bottom of well 72 through aperture 88 into nozzle passage 64.

A mixing screw housing 94 is also shown in FIG. 7 which, in the disclosed embodiment, is plugged with balls. A fuel inlet 96 is provided which may be provided with a fuel valve, as desired.

A spring clip 98 is used to secure the fuel bowl assembly 54 to body 10. Spring clip 98 includes a pair of bights 100 which grip the upper surface of flat 12 and comprises a cradle for cradling the fuel bowl assembly 54 and securing it to body 10. Fuel bowl assembly 54 is sealed to body 10 by means of a resilient gasket 104 as is conventional in carburetor assemblies. Lastly, a Welch plug 108 is shown in FIG. 8 for closing off the idle pocket as in conventional carburetors.

In summary, after molding of the fuel bowl 70, a spring 76 is inserted in well 72 after which nozzle 62 including an O-ring 78 is inserted into well 72. The entire fuel bowl assembly 54 is then secured to body 10 with gasket 104 inserted therebetween. Fuel bowl assembly 54 also includes a pair of locating studs which are inserted into apertures in flat 12 of carburetor body 10. Therefore no threaded fasteners are necessary for securing the entire assembly. Conversely, if the carburetor is to be disassembled only clip 98 needs to be removed after which the entire fuel bowl assembly may be cleaned. Thus the servicing of the carburetor assembly is simplified and may be performed without removing the entire carburetor from an engine. It should also be noted that by providing the primer assembly as well as the fuel nozzle and the like as parts of the fuel bowl assembly, servicing can be accomplished of the carburetor without loosening and removing the linkages for operating the throttle and choke, thereby eliminating the need for readjustment of those parts after the carburetor is cleaned and reassembled.

While this invention has been described as having a preferred design, it will be understood that it is capable of further modifications. This application is therefore intended to cover any variations, uses, or adaptations of the invention following the general principles thereof and including such departures from the present disclosure as come within known or customary practice in the art to which the invention pertains and fall within the limits of the appended claims.

What is claimed is:

1. A method of making a carburetor comprising:
   forming an extrusion;
   cutting a carburetor body of a predetermined length from said extrusion;
   providing a fuel bowl;
   securing said fuel bowl to said body; and
   forming fluid passages in said body.

2. The method according to claim 1 wherein the passages in said body are machined therein.

3. The method according to claim 1 wherein said securing step comprises securing said fuel bowl to said body with a resilient clip.

4. The method according to claim 1 including the step of molding said fuel bowl from a plastic material.

5. The method according to claim 1 including the step of inserting a venturi member into said body.

6. The method according to claim 5 including the step of molding said venturi member from plastic material.

7. The method according to claim 6 including the step of molding channels in the outside surface of said venturi member whereby said channels form passageways with said body.

8. The method according to claim 1 wherein said body is extruded from aluminum.

9. The method of claim 1 wherein the step of extrusion comprises extruding said body of metal.

10. A method of making a carburetor comprising:
    forming an extrusion;
    cutting a carburetor body of predetermined length from said extrusion;
    forming fluid passages in said body;
    molding a fuel bowl from a plastic material;
    providing a resilient clip; and
    securing said fuel bowl to said body with said resilient clip.

11. The method according to claim 10 including the step of inserting a venturi member into said body.

12. The method according to claim 10 including the steps of molding a venturi member from plastic material, and inserting said venturi member into said body.

13. The method according to claim 10 including the steps of molding a venturi member from plastic material, said venturi member including molded channels in its outside surface, and inserting said venturi member into said body whereby said channels form passageways with said body.

14. The method according to claim 10 wherein said body is extrided from aluminum.

15. The method according to claim 10 wherein the passages in said body are machined therein.

16. A method for making a carburetor comprising:
    forming an extrusion;
    cutting a carburetor body of predetermined length from said extrusion;
    providing a venturi member;
    inserting said venturi member into a cavity in said body;
    molding a fuel bowl from a plastic material;
    providing a resilient clip means; and
    securing said fuel bowl to said body with said resilient clip means.

17. The method according to claim 16 wherein the passages in said body are machined therein.

18. The method according to claim 16 including the step of molding said venturi member from plastic material.

19. The method according to claim 18 including the step of molding channels in the outside surface of said venturi member whereby said channels form passageways with said body.

20. The method according to claim 16 wherein said body is composed of aluminum.

* * * * *